United States Patent
Blachman et al.

(10) Patent No.: US 11,611,629 B2
(45) Date of Patent: Mar. 21, 2023

(54) INLINE FRAME MONITORING

(71) Applicant: Microsoft Technology Licensing, LLC, Redmond, WA (US)

(72) Inventors: Meir Blachman, Ramat-Gan (IL); Itamar Azulay, Mishmar Ayyalon (IL); Guy Lewin, New York City, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/930,927

(22) Filed: May 13, 2020

(65) Prior Publication Data
US 2021/0360080 A1 Nov. 18, 2021

(51) Int. Cl.
*H04L 67/561* (2022.01)
*G06F 16/958* (2019.01)
(Continued)

(52) U.S. Cl.
CPC .......... *H04L 67/561* (2022.05); *G06F 16/958* (2019.01); *H04L 41/06* (2013.01); *H04L 63/1408* (2013.01); *H04L 67/562* (2022.05)

(58) Field of Classification Search
CPC . H04L 67/2804; H04L 41/06; H04L 63/1408; H04L 67/2809; H04L 63/168; H04L 67/22; H04L 63/0281; H04L 67/02; H04L 41/5083; H04L 41/5096; H04L 67/04; H04L 67/10; H04L 67/2819; H04L 67/2823; H04L 67/2833; H04L 63/20; H04L 67/14; H04L 67/28; H04L 63/1433; H04L 63/08; H04L 63/10; H04L 63/123; H04L 2463/082; H04L 29/0809; H04L 61/15; H04L 61/305; H04L 63/126; H04L 63/1466; H04L 67/16; H04L 67/20; H04L 67/34; H04L 69/162; G06F 16/958; G06F 16/972; G06F 16/986; G06F 21/51; G06F 21/121; G06F 21/125; G06F 21/128; G06F 21/16; G06F 21/62; G06F 21/6281; G06F 3/04842; G06F 3/04892; G06F 9/542; G06F 9/543; G06F 21/54; G06F 21/554; G06F 40/14; G06F 21/566; G06F 11/3664; G06F 11/3688; G06F 21/55; G06F 21/556; G06F 21/56; G06F 21/6245; G06F 3/0481; G06F 11/3006; G06F 11/3089; G06F 11/3409; G06F 11/3419; G06F 11/3433; G06F 16/9577; G06F 21/12; G06F 21/52; G06F 21/60; G06F 3/0482; G06F 3/0488; G06F 9/44526; G06F 11/302; G06F 11/3438; G06F 16/955; G06F 21/629;
(Continued)

(56) References Cited

U.S. PATENT DOCUMENTS

6,473,800 B1 * 10/2002 Jerger ..................... G06F 21/52
709/224
7,293,034 B2 * 11/2007 Paya ....................... G06F 21/41
(Continued)

*Primary Examiner* — Greg C Bengzon
(74) *Attorney, Agent, or Firm* — Wade IP Law PLLC (57) ABSTRACT

An example inline frame monitor is disclosed. The inline frame monitor injects monitoring logic into a document object model to monitor an activity within a dynamically loaded inline frame of a web page. Data regarding the activity within the dynamically loaded inline frame is received. A policy is applied to validate or invalidate the activity within the dynamically loaded inline frame.

20 Claims, 3 Drawing Sheets

(51) Int. Cl.
*H04L 41/06* (2022.01)
*H04L 9/40* (2022.01)
*H04L 67/562* (2022.01)

(58) Field of Classification Search
CPC ........... G06F 2201/86; G06F 2201/865; G06F 2221/2101; G06F 2221/2123; G06F 40/154; G06F 40/166; G06F 9/44; G06F 9/545; H04W 12/1208; H04W 12/0027; H04W 12/0023
See application file for complete search history.

(56) References Cited

U.S. PATENT DOCUMENTS

| | | | | |
|---|---|---|---|---|
| 7,325,188 B1* | 1/2008 | Covington | ............ | G06F 16/958 715/251 |
| 7,343,625 B1* | 3/2008 | Zaidi | ............ | G06F 16/957 726/25 |
| 7,437,660 B1* | 10/2008 | Mehta | ............ | G06F 16/972 715/205 |
| 7,970,891 B1* | 6/2011 | Kontothanssis | .... | G06F 16/9566 709/224 |
| 8,370,938 B1* | 2/2013 | Daswani | ............ | G06F 21/562 726/23 |
| 8,484,561 B1* | 7/2013 | Lemonik | ............ | G06Q 10/101 715/255 |
| 8,548,917 B1* | 10/2013 | Sripracha | ............ | G06F 21/44 705/14.54 |
| 8,555,391 B1* | 10/2013 | Demir | ............ | G06F 21/56 713/188 |
| 8,839,350 B1* | 9/2014 | McNair | ............ | G06F 21/6263 726/1 |
| 8,856,869 B1* | 10/2014 | Brinskelle | ............ | G06F 21/6218 726/2 |
| 8,997,226 B1* | 3/2015 | Call | ............ | H04L 63/1416 726/22 |
| 9,037,914 B1* | 5/2015 | Au | ............ | G06F 11/0793 714/38.14 |
| 9,112,900 B1* | 8/2015 | Peacock | ............ | G06F 40/14 |
| 9,160,756 B2* | 10/2015 | Pieczul | ............ | H04L 63/1408 |
| 9,223,961 B1* | 12/2015 | Sokolov | ............ | G06F 21/51 |
| 9,251,372 B1* | 2/2016 | Lahoz | ............ | G06Q 30/0613 |
| 9,325,734 B1* | 4/2016 | Peacock | ............ | G06F 40/14 |
| 9,392,053 B2* | 7/2016 | Fausak | ............ | H04L 67/42 |
| 9,398,017 B1* | 7/2016 | Nizametdinov | ........ | H04L 63/10 |
| 9,432,383 B2* | 8/2016 | Johns | ............ | G06F 40/143 |
| 9,507,651 B2* | 11/2016 | McDonald | ............ | G06F 40/151 |
| 9,813,440 B1* | 11/2017 | Hoover | ............ | G06F 21/566 |
| 9,825,984 B1* | 11/2017 | Hoover | ............ | H04L 63/145 |
| 9,858,440 B1* | 1/2018 | Wang | ............ | G06F 21/54 |
| 9,912,767 B1* | 3/2018 | Weald | ............ | H04L 67/20 |
| 10,097,624 B1* | 10/2018 | Palladino | ............ | H04L 67/28 |
| 10,134,070 B2* | 11/2018 | Wadley | ............ | G06Q 30/0613 |
| 10,203,852 B2* | 2/2019 | Ellbogen | ............ | G06F 3/04842 |
| 10,205,749 B1* | 2/2019 | Sem Siev | ............ | H04L 63/1466 |
| 10,225,330 B2* | 3/2019 | Palladino | ............ | H04L 67/10 |
| 10,348,756 B2* | 7/2019 | Oberheide | ............ | H04W 12/128 |
| 10,367,774 B2* | 7/2019 | Li | ............ | H04L 51/08 |
| 10,397,243 B2* | 8/2019 | Johns | ............ | H04L 63/1408 |
| 10,404,662 B1* | 9/2019 | Ben-Dor | ............ | H04L 67/53 |
| 10,412,113 B2* | 9/2019 | Hanley | ............ | H04L 63/1433 |
| 10,417,588 B1* | 9/2019 | Kreisel | ............ | G06Q 10/063 |
| 10,467,408 B1* | 11/2019 | Siev | ............ | G06F 21/56 |
| 10,482,239 B1* | 11/2019 | Liu | ............ | G06F 21/563 |
| 10,599,834 B1* | 3/2020 | Stoletny | ............ | H04L 63/1466 |
| 10,708,281 B1* | 7/2020 | Modalavalasa | ....... | H04L 61/302 |
| 10,719,332 B1* | 7/2020 | Dwivedi | ............ | H04L 67/34 |
| 10,719,373 B1* | 7/2020 | Koponen | ............ | H04L 9/0891 |
| 10,733,638 B1* | 8/2020 | Jain | ............ | G06Q 50/01 |
| 10,747,881 B1* | 8/2020 | Luo | ............ | H04L 63/1491 |
| 10,754,638 B1* | 8/2020 | Dwivedi | ............ | H04L 67/025 |
| 10,802,950 B2* | 10/2020 | Kastyshyn | ......... | G06F 11/3664 |
| 10,902,522 B1* | 1/2021 | Kreisel | ............ | G06Q 40/08 |
| 11,068,584 B2* | 7/2021 | Burriesci | ............ | G06F 21/51 |
| 11,128,644 B2* | 9/2021 | Siev | ............ | G06F 21/54 |
| 11,379,550 B2* | 7/2022 | Brain | ............ | G06F 16/957 |
| 11,429,951 B1* | 8/2022 | Bu | ............ | G06Q 20/341 |
| 2005/0086344 A1* | 4/2005 | Suesserman | ............ | H04L 67/02 709/227 |
| 2006/0168221 A1* | 7/2006 | Juhls | ............ | H04L 67/02 709/225 |
| 2007/0016954 A1* | 1/2007 | Choi | ............ | G06F 21/577 726/25 |
| 2007/0136337 A1* | 6/2007 | Sah | ............ | G06F 16/958 |
| 2007/0136443 A1* | 6/2007 | Sah | ............ | G06F 16/9535 709/219 |
| 2008/0127338 A1* | 5/2008 | Cho | ............ | G06F 21/566 726/22 |
| 2008/0228911 A1* | 9/2008 | Mackey | ............ | H04L 67/2804 709/224 |
| 2008/0263566 A1* | 10/2008 | Buerge | ............ | G06F 16/00 719/317 |
| 2008/0276183 A1* | 11/2008 | Siegrist | ............ | G06F 9/45512 715/748 |
| 2008/0313648 A1* | 12/2008 | Wang | ............ | G06F 21/53 719/315 |
| 2009/0063613 A1* | 3/2009 | Chijiiwa | ............ | G06Q 10/10 709/202 |
| 2009/0070190 A1* | 3/2009 | Gorty | ............ | G06Q 30/0241 705/14.6 |
| 2009/0187918 A1* | 7/2009 | Chen | ............ | G06F 21/52 719/313 |
| 2009/0217158 A1* | 8/2009 | Bailey | ............ | G06F 40/166 715/255 |
| 2009/0271806 A1* | 10/2009 | McDonald | ............ | G06F 40/106 719/329 |
| 2009/0288012 A1* | 11/2009 | Hertel | ............ | G06Q 20/105 715/769 |
| 2010/0058293 A1* | 3/2010 | Dunagan | ............ | G06Q 30/0277 717/116 |
| 2011/0030060 A1* | 2/2011 | Kejriwal | ............ | H04L 63/1416 726/25 |
| 2011/0154130 A1* | 6/2011 | Helander | ............ | H04L 65/1006 714/48 |
| 2011/0179472 A1* | 7/2011 | Ganesan | ............ | G06F 21/42 726/6 |
| 2011/0225506 A1* | 9/2011 | Casalaina | ............ | G06Q 30/016 715/744 |
| 2011/0289546 A1* | 11/2011 | Pieczul | ............ | G06F 21/53 726/1 |
| 2011/0289582 A1* | 11/2011 | Kejriwal | ............ | G06F 21/566 726/22 |
| 2011/0302653 A1* | 12/2011 | Frantz | ............ | H04L 63/1408 726/22 |
| 2012/0030556 A1* | 2/2012 | Cohen | ............ | G06F 16/957 715/221 |
| 2012/0089481 A1* | 4/2012 | Iozzia | ............ | G06F 21/606 705/26.41 |
| 2012/0090030 A1* | 4/2012 | Rapaport | ............ | G06F 21/552 726/23 |
| 2012/0204093 A1* | 8/2012 | Habarakada | ......... | G06F 16/972 715/234 |
| 2012/0222117 A1* | 8/2012 | Wong | ............ | H04L 67/02 726/23 |
| 2012/0246017 A1* | 9/2012 | Kleber | ............ | G06Q 30/02 705/14.73 |
| 2012/0266060 A1* | 10/2012 | Roberts | ............ | G06F 16/9577 715/234 |
| 2013/0031600 A1* | 1/2013 | Luna | ............ | G06F 21/60 726/1 |
| 2013/0055289 A1* | 2/2013 | Maltese | ............ | H04L 69/162 719/320 |
| 2013/0111560 A1* | 5/2013 | Arenas | ............ | H04L 67/51 726/4 |
| 2013/0132833 A1* | 5/2013 | White | ............ | G06F 3/048 715/704 |
| 2013/0173720 A1* | 7/2013 | Vasudev | ............ | H04L 67/141 709/206 |
| 2013/0191880 A1* | 7/2013 | Conlan | ............ | G06F 21/53 726/1 |

(56) References Cited

U.S. PATENT DOCUMENTS

| | | | |
|---|---|---|---|
| 2014/0101136 A1* | 4/2014 | Mizuno | G06F 16/951 707/722 |
| 2014/0109115 A1* | 4/2014 | Low | G06F 9/44526 719/328 |
| 2014/0129920 A1* | 5/2014 | Sheretov | H04L 63/20 715/234 |
| 2014/0173730 A1* | 6/2014 | Bejerasco | G06F 21/50 726/22 |
| 2014/0229821 A1* | 8/2014 | Abrahami | G06F 40/14 715/235 |
| 2014/0258262 A1* | 9/2014 | Balz | G06F 3/0481 707/709 |
| 2014/0280515 A1* | 9/2014 | Wei | H04L 67/2847 709/203 |
| 2014/0281918 A1* | 9/2014 | Wei | H04L 67/02 715/234 |
| 2014/0303934 A1* | 10/2014 | Mylarappa | H04L 67/561 702/186 |
| 2015/0046789 A1* | 2/2015 | Wei | G06F 9/452 715/234 |
| 2015/0067031 A1* | 3/2015 | Acharya | H04W 4/60 709/203 |
| 2015/0088968 A1* | 3/2015 | Wei | G06F 9/46 709/203 |
| 2015/0089354 A1* | 3/2015 | Abrahami | G06F 16/958 715/235 |
| 2015/0135302 A1* | 5/2015 | Cohen | G06F 9/5072 726/12 |
| 2015/0156084 A1* | 6/2015 | Kaminsky | H04L 43/04 709/224 |
| 2015/0172399 A1* | 6/2015 | Liu | H04L 43/10 709/204 |
| 2015/0180875 A1* | 6/2015 | Kay | H04L 63/123 726/4 |
| 2015/0193406 A1* | 7/2015 | Lemonik | H04L 67/104 715/256 |
| 2015/0195311 A1* | 7/2015 | Lemonik | G06F 9/44 715/753 |
| 2015/0199317 A1* | 7/2015 | Lemonik | G06F 9/44526 715/255 |
| 2015/0199318 A1* | 7/2015 | Lemonik | G06F 40/151 715/255 |
| 2015/0256556 A1* | 9/2015 | Kaminsky | H04L 63/168 726/23 |
| 2015/0339479 A1* | 11/2015 | Wang | G06F 21/556 726/22 |
| 2016/0028742 A1* | 1/2016 | Johns | H04L 63/123 726/26 |
| 2016/0028743 A1* | 1/2016 | Johns | G06F 40/143 726/26 |
| 2016/0088015 A1* | 3/2016 | Sivan | H04L 29/08 726/23 |
| 2016/0094575 A1* | 3/2016 | Shekyan | H04L 63/168 726/25 |
| 2016/0124742 A1* | 5/2016 | Rangasamy | G06F 9/5072 717/103 |
| 2016/0179766 A1* | 6/2016 | Kim | G06F 3/0485 715/206 |
| 2016/0191554 A1* | 6/2016 | Kaminsky | H04L 63/1425 726/23 |
| 2016/0283460 A1* | 9/2016 | Weald | H04L 67/42 |
| 2016/0323249 A1* | 11/2016 | Duncker | G06F 16/26 |
| 2016/0350539 A1* | 12/2016 | Oberheide | H04L 63/20 |
| 2017/0011010 A1* | 1/2017 | Eom | G06F 3/1423 |
| 2017/0053139 A1* | 2/2017 | Schenk | G06F 21/6254 |
| 2017/0063923 A1* | 3/2017 | Yang | H04L 63/1483 |
| 2017/0083486 A1* | 3/2017 | van der Horst | G06F 16/9577 |
| 2017/0118241 A1* | 4/2017 | Call | H04L 67/22 |
| 2017/0126719 A1* | 5/2017 | Mason | H04L 63/145 |
| 2017/0195353 A1* | 7/2017 | Taylor | G06F 12/0813 |
| 2017/0213032 A1* | 7/2017 | Zhang | G06F 21/57 |
| 2017/0228263 A1* | 8/2017 | Seitz | G06F 8/71 |
| 2017/0264712 A1* | 9/2017 | Magnusson, Jr. | H04L 67/146 |
| 2017/0277625 A1* | 9/2017 | Shtuchkin | G06F 11/3688 |
| 2017/0315974 A1* | 11/2017 | Kong | G06F 40/171 |
| 2017/0318045 A1* | 11/2017 | Johns | H04L 63/1433 |
| 2017/0344384 A1* | 11/2017 | Wadley | H04L 67/18 |
| 2018/0007046 A1* | 1/2018 | Oberheide | H04L 63/205 |
| 2018/0041567 A1* | 2/2018 | Kidambi | H04L 67/327 |
| 2018/0041812 A1* | 2/2018 | Brown | H04L 65/4084 |
| 2018/0103055 A1* | 4/2018 | Keohane | H04L 63/20 |
| 2018/0137544 A1* | 5/2018 | Thomas | H04L 63/101 |
| 2018/0139180 A1* | 5/2018 | Napchi | H04L 43/08 |
| 2018/0152410 A1* | 5/2018 | Jackson | H04L 67/02 |
| 2018/0198807 A1* | 7/2018 | Johns | H04L 63/1425 |
| 2018/0288094 A1* | 10/2018 | Ahuja | H04L 41/0893 |
| 2018/0324064 A1* | 11/2018 | Tola | H04L 43/04 |
| 2018/0349602 A1* | 12/2018 | Johns | G06F 21/552 |
| 2018/0349891 A1* | 12/2018 | Putre | G06Q 20/38215 |
| 2018/0351986 A1* | 12/2018 | Johns | H04L 63/1416 |
| 2018/0367572 A1* | 12/2018 | Frisbie | G06F 21/53 |
| 2018/0373849 A1* | 12/2018 | Gidley | G06F 21/128 |
| 2019/0012390 A1* | 1/2019 | Nishant | G06F 16/248 |
| 2019/0020673 A1* | 1/2019 | Weinstein | H04L 67/125 |
| 2019/0065616 A1* | 2/2019 | Brain | G06Q 30/0601 |
| 2019/0065978 A1* | 2/2019 | Martine | H04L 67/20 |
| 2019/0068723 A1* | 2/2019 | Drasin | H04L 67/10 |
| 2019/0179884 A1* | 6/2019 | Wooldridge | G06F 40/174 |
| 2019/0199699 A1* | 6/2019 | Smith | H04L 9/40 |
| 2019/0213326 A1* | 7/2019 | Dykes | G06F 21/552 |
| 2019/0220591 A1* | 7/2019 | Burriesci | H04L 63/168 |
| 2019/0238598 A1* | 8/2019 | Mohamad Abdul | H04L 63/0807 |
| 2019/0273746 A1* | 9/2019 | Coffing | H04L 63/105 |
| 2019/0303584 A1* | 10/2019 | Yang | G06F 21/564 |
| 2019/0318122 A1* | 10/2019 | Hockey | G06Q 20/02 |
| 2019/0324881 A1* | 10/2019 | Buffone | H04L 67/02 |
| 2019/0327324 A1* | 10/2019 | Buffone | H04L 67/2819 |
| 2019/0332760 A1* | 10/2019 | Liu | G06F 3/04886 |
| 2019/0332805 A1* | 10/2019 | Tola | G06F 21/6254 |
| 2019/0347689 A1* | 11/2019 | Bullock | G06Q 30/0277 |
| 2020/0028848 A1* | 1/2020 | Gupta | G06F 21/105 |
| 2020/0053111 A1* | 2/2020 | Jakobsson | H04L 51/12 |
| 2020/0074084 A1* | 3/2020 | Dorrans | G06F 21/6245 |
| 2020/0076813 A1* | 3/2020 | Felice-Steele | G06F 21/604 |
| 2020/0089597 A1* | 3/2020 | Kastyshyn | G06F 16/958 |
| 2020/0097346 A1* | 3/2020 | Nguyen | G06F 9/541 |
| 2020/0104488 A1* | 4/2020 | Li | G06F 40/221 |
| 2020/0128020 A1* | 4/2020 | Abduljaber | H04L 63/10 |
| 2020/0159960 A1* | 5/2020 | Jakobsson | G06F 21/6245 |
| 2020/0167446 A1* | 5/2020 | Azulay | G06F 21/554 |
| 2020/0183761 A1* | 6/2020 | Roy | H04L 63/145 |
| 2020/0236102 A1* | 7/2020 | Azulay | H04L 67/32 |
| 2020/0250342 A1* | 8/2020 | Miller | H04L 63/126 |
| 2020/0272670 A1* | 8/2020 | Vaishnavi | G06F 16/955 |
| 2020/0275266 A1* | 8/2020 | Jakobsson | H04L 67/303 |
| 2020/0301939 A1* | 9/2020 | Hollander | G06F 16/2471 |
| 2020/0301940 A1* | 9/2020 | Hollander | G06F 16/2471 |
| 2020/0326927 A1* | 10/2020 | Lopyrev | G06F 9/54 |
| 2020/0356661 A1* | 11/2020 | Stoletny | H04L 63/1466 |
| 2020/0358818 A1* | 11/2020 | Stoletny | G06F 21/566 |
| 2021/0342439 A1* | 11/2021 | Burriesci | G06F 16/9577 |

\* cited by examiner

INLINE FRAME MONITORING

BACKGROUND

Security brokers, such as cloud access security brokers, are on-premises or cloud-based security enforcement points disposed in a computer network between users, such as clients via user agents, and network service providers, which may include content servers that may combine and interject security policies as the services are being accessed. For example, an enterprise may employ a cloud access security broker to address cloud service risks, enforce security policies, and comply with regulations for the users of the enterprise to access cloud-based services including resources such as webpages, which can include web applications. The broker may apply a security policy or multiple types of security policy enforcement including authentication, single sign-on, authorization, credential mapping, device profiling, encryption, tokenization, logging, alerting, and malware detection or protection. For instance, the broker may monitor user activity, warn administrators about potentially hazardous actions, enforce security policy compliance, and automatically address malware.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

Security brokers, or security services in general, can offer proxy policy systems that monitor and protect users from certain content and export of sensitive information. Sites can attempt to bypass security services including proxies with inline frames to dispatch client-side activities in browsers. An example inline frame monitor is disclosed. In one example, the inline frame monitor allows for the detection and capture of activities dispatched within an inline frame, which includes activities generated in the browser that may not otherwise be detectable at the proxy. In one example, the inline frame monitor can detect content within an empty inline frame that is created in the client-side and dynamically injected with an HTML document from the parent frame. The inline frame monitor injects monitoring logic into a document object model to monitor an activity within a dynamically loaded inline frame of a web page. An activity can include an event or navigation and code execution to be monitored or tracked. Data regarding the activity within the dynamically loaded inline frame is received. A policy is applied to validate or invalidate the activity within the dynamically loaded inline frame. The inline frame monitor is generic, cross-platform, and multipurpose, and the inline frame monitor allows monitoring of activities generated on the client side.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
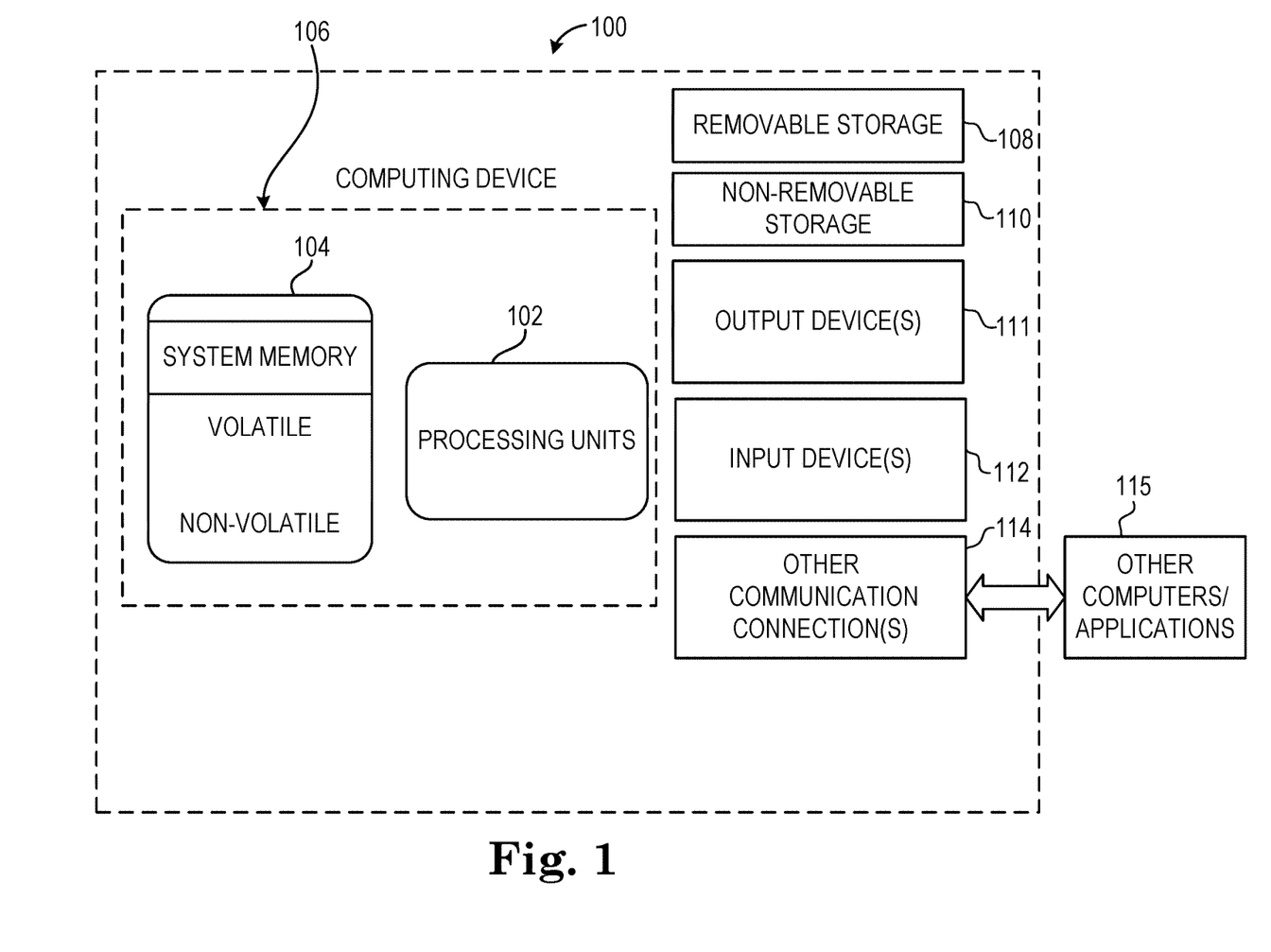
FIG. 1 is a block diagram illustrating an example of a computing device, which can be configured in a computer network.

FIG. 1 illustrates an exemplary computer system that can be employed in an operating environment and used to host or run a computer application included on one or more computer readable storage mediums storing computer executable instructions for controlling the computer system, such as a computing device, to perform a process. The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), nonvolatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the internet, or other network.

In one example, one or more of computing device 100 can be configured as a client device for a user in the network. The client device can be configured to establish a remote connection with a server on a network in a computing environment. The client device can be configured to run applications or software such as operating systems, web browsers, cloud access agents, terminal emulators, or utilities. In one example, the client device can also be configured to further include a server application.

In one example, one or more of computing device 100 can be configured as a server in the network such as a server device. The server can be configured to establish a remote connection with the client device in a computing network or computing environment. The server can be configured to run application or software such as operating systems.

In one example, one or more of computing devices 100 can be configured as servers in a datacenter to provide distributed computing services such as cloud computing services. A data center can provide pooled resources on which customers or tenants can dynamically provision and scale applications as needed without having to add servers or additional networking. The datacenter can be configured to communicate with local computing devices such used by cloud consumers including personal computers, mobile devices, embedded systems, or other computing devices. Within the data center, computing device 100 can be configured as servers, either as stand alone devices or individual blades in a rack of one or more other server devices. One or more host processors, such as processors 102, as well as other components including memory 104 and storage 110, on each server run a host operating system that can support multiple virtual machines. A tenant may initially use one virtual machine on a server to run an application. The datacenter may activate additional virtual machines on a server or other servers when demand increases, and the datacenter may deactivate virtual machines as demand drops.

Datacenter may be an on-premises, private system that provides services to a single enterprise user or may be a publicly (or semi-publicly) accessible distributed system that provides services to multiple, possibly unrelated customers and tenants, or may be a combination of both. Further, a datacenter may be a contained within a single geographic location or may be distributed to multiple locations across the globe and provide redundancy and disaster recovery capabilities. For example, the datacenter may designate one virtual machine on a server as the primary location for a tenant's application and may activate another virtual machine on the same or another server as the secondary or back-up in case the first virtual machine or server fails.

A cloud-computing environment is generally implemented in one or more recognized models to run in one or more network-connected datacenters. A private cloud deployment model includes an infrastructure operated solely for an organization whether it is managed internally or by a third-party and whether it is hosted on premises of the organization or some remote off-premises location. An example of a private cloud includes a self-run datacenter. A public cloud deployment model includes an infrastructure made available to the general public or a large section of the public such as an industry group and run by an organization offering cloud services. A community cloud is shared by several organizations and supports a particular community of organizations with common concerns such as jurisdiction, compliance, or security. Deployment models generally include similar cloud architectures, but may include specific features addressing specific considerations such as security in shared cloud models.

Cloud-computing providers generally offer services for the cloud-computing environment as a service model provided as one or more of an infrastructure as a service, platform as a service, and other services including software as a service. Cloud-computing providers can provide services via a subscription to tenants or consumers. For example, software as a service providers offer software applications as a subscription service that are generally accessible from web browsers or other thin-client interfaces, and consumers do not load the applications on the local computing devices. Infrastructure as a service providers offer consumers the capability to provision processing, storage, networks, and other fundamental computing resources where the consumer is able to deploy and run software, which can include operating systems and applications. The consumer generally does not manage the underlying cloud infrastructure, but generally retains control over the computing platform and applications that run on the platform. Platform as a service providers offer the capability for a consumer to deploy onto the cloud infrastructure consumer-created or acquired applications created using programming languages, libraries, services, and tools supported by the provider. In some examples, the consumer does not manage or control the underlying cloud infrastructure including network, servers, operating systems, or storage, but has control over the deployed applications and possibly configuration settings for the application-hosting environment.

In other examples, the provider can offer a combination of infrastructure and platform services to allow a consumer to manage or control the deployed applications as well as the underlying cloud infrastructure. Platform as a service providers can include infrastructure, such as servers, storage, and networking, and also middleware, development tools, business intelligence services, database management services, and more, and can be configured to support the features of the application lifecycle including one or more of building, testing, deploying, managing, and updating.

Figure 2:
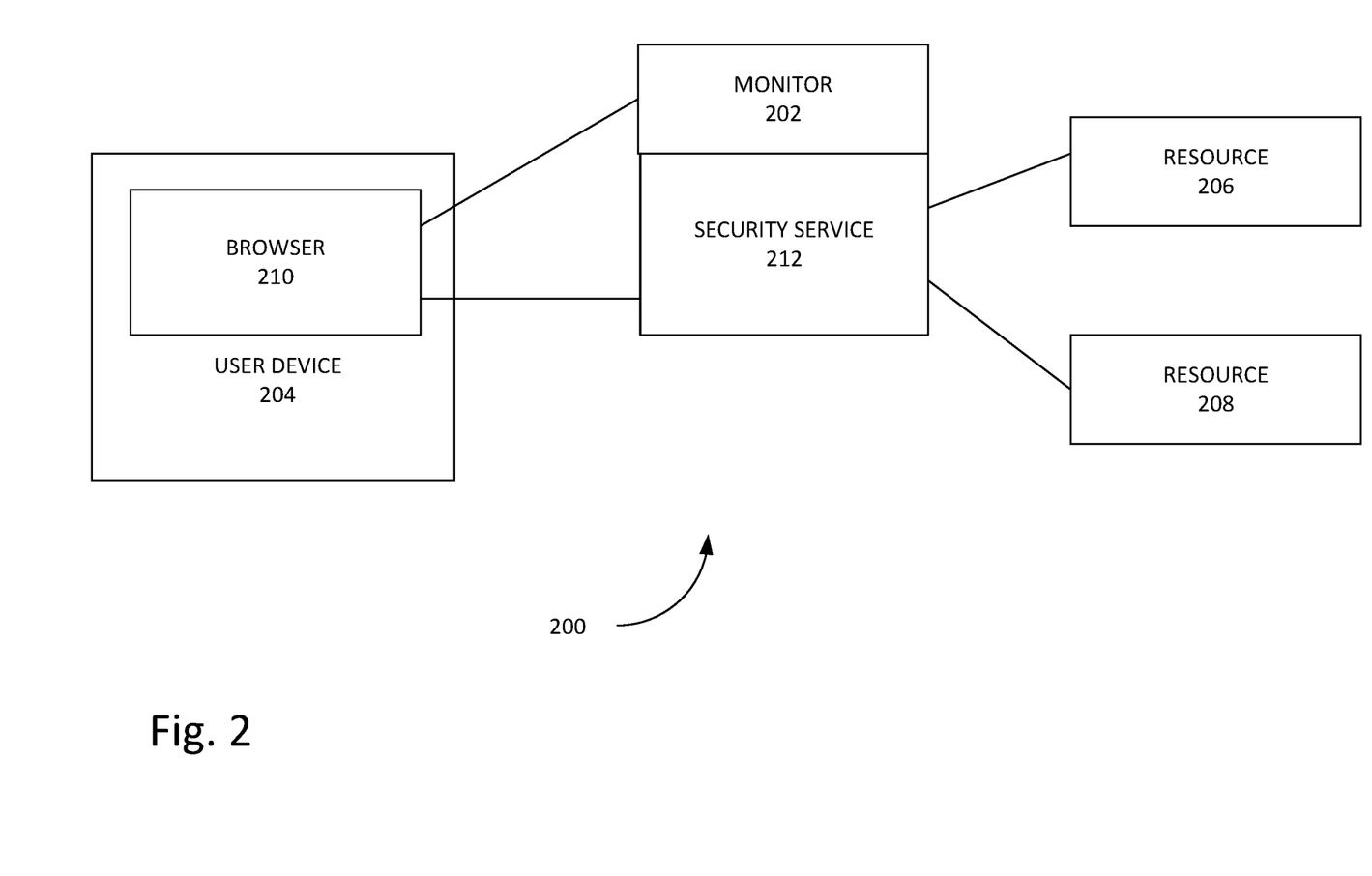
FIG. 2 is a schematic diagram illustrating an example computer network having an example inline frame monitor of the disclosure, which can be configured on the example computing device of FIG. 1.

FIG. 2 illustrates an example computer network 200 including an inline frame monitor 202 in which the computer network 200 illustrates an example environment for the inline frame monitor 202. The computer network 200 includes a user device 204, such as a client device in a client-server architecture, and a resource devices 206, 208, such as a server devices in the client-server architecture. The user device 204 can be configured to operate a user agent 210, such as a web browser or dedicated communication application such as mobile application, to access and display content on the user device 204, the content which can be provided by the resource devices 206, 208. In one example, the content can include a web page, which includes a collection of content provided by a web server, such as, in one example, resource devices 206, 208, and the web page is displayed on the user device 204 via the user agent 210. The web page, in one example, can include an HTML (Hypertext Markup Language) document which can be read by the user agent 210 and rendered in the user device 204. In an example, a web page loaded in a web browser creates a Document Object Model, or DOM, of the web page by parsing the HTML into a DOM. The DOM is an object-oriented representation of the HTML document that acts as a cross-platform and language-independent interface between a programming language such as JavaScript and the document itself that allows programmatic access to change structure, style and content of the document. For example, within a document, the programming language can add, change, and remove any of the HTML elements and attributes change any of the CSS (Cascading Style Sheet) styles, reacting to events, and create new events.

In one example, the web page can include a parent document, such as a HTML document, provided by resource device 206 and an inline frame, or iframe, which is another HTML document embedded into the parent document, provided by resource device 208. The parent document and the iframe can be rendered together in the user agent 210. In one example, the content within the iframe can be changed without reloading the parent document in the user agent 210. The iframe can be enabled via a programming language such as JavaScript or an element such as an HTML anchor. The HTML documents in the parent web page and the iframe can include dynamic web pages to create a live dynamic or interactive user experience as compared to static content. For example, the construction of the web page can be controlled by an application server processing server-sided scripts. Also, HTML document can apply HTML scripting running in the browser to dynamically update and change the DOM. In one example, a dynamic web page updated with AJAX (Asynchronous JavaScript and XML [extensible markup language]) to apply a combination of client-side scripting and server-side requests for data, in examples, will not create a page to back to and will not truncate the browser history forward of the displayed page.

The inline frame monitor 202 can be configured to operate with a security service 212. For example, the inline frame monitor 202 can be incorporated into a security service 212 as an element of the security service 212 or as a feature of a suite of security service 212 functionality. The security service 212 can provide services between the user device 204 and the resource devices 206, 208. In one example, the security service 212 may support multiple users of an enterprise. In some examples, security service 212 may be deployed on premises or accessed via a cloud service. For example, the security service 212 may support multiple enterprises in a multitenancy model. Security service 212 can monitor activity between the user device 204 and the resource devices 206, 208 and enforce security policies. For example, the security service 212 can be configured as a cloud access security broker that can monitor user activity, warn administrators about potentially hazardous actions, enforce security policy compliance, and automatically prevent or reduce the likelihood of malware in the enterprise. In one example, the security service 212 includes a distributed, cloud-based proxy that is an inline broker for activity on the network 200. For instance, the security service 212 can be configured to monitor static web pages as well as server-side dynamically loaded web pages.

In one example, the security service 212 provides mechanisms for enforcement of a policy regarding access to web pages including a mechanism to monitor data exported from web pages accessed via a proxy service. In order to affect the policy, the security service can monitor web pages requested from resource devices 206, 208 including resources being requested by the user device 204 and dynamically generated in the user agent 210. In one example, the inline frame monitor 202 includes a detection and reporting mechanism for browser-based client-side activities. The inline frame monitor 202 injects monitoring logic into the DOM to monitor dynamically loaded inline frames and provides for visibility from the security service of activity within the browser of client-only activities. For example, inline frames can include activities, which can include events, that are created in the client side and dynamically injected with HTML content from the parent document. An activity can include an event or navigation and code execution to be monitored or tracked. The inline frame monitor 202 can be used to capture the activities dispatched within the iframe context. Further, the inline frame monitor 202 or the security service 212 can validate the actions within the inline frames with respect to the security policy and log, report with an alert, or block the action in accordance with the security policy. In one example, the actions can be validated synchronously in the inline frame. The inline frame monitor 202 can prevent a website, such as a web page from resource device 208, to bypass the proxy service using an iframe to dispatch browser client events.

Figure 3:
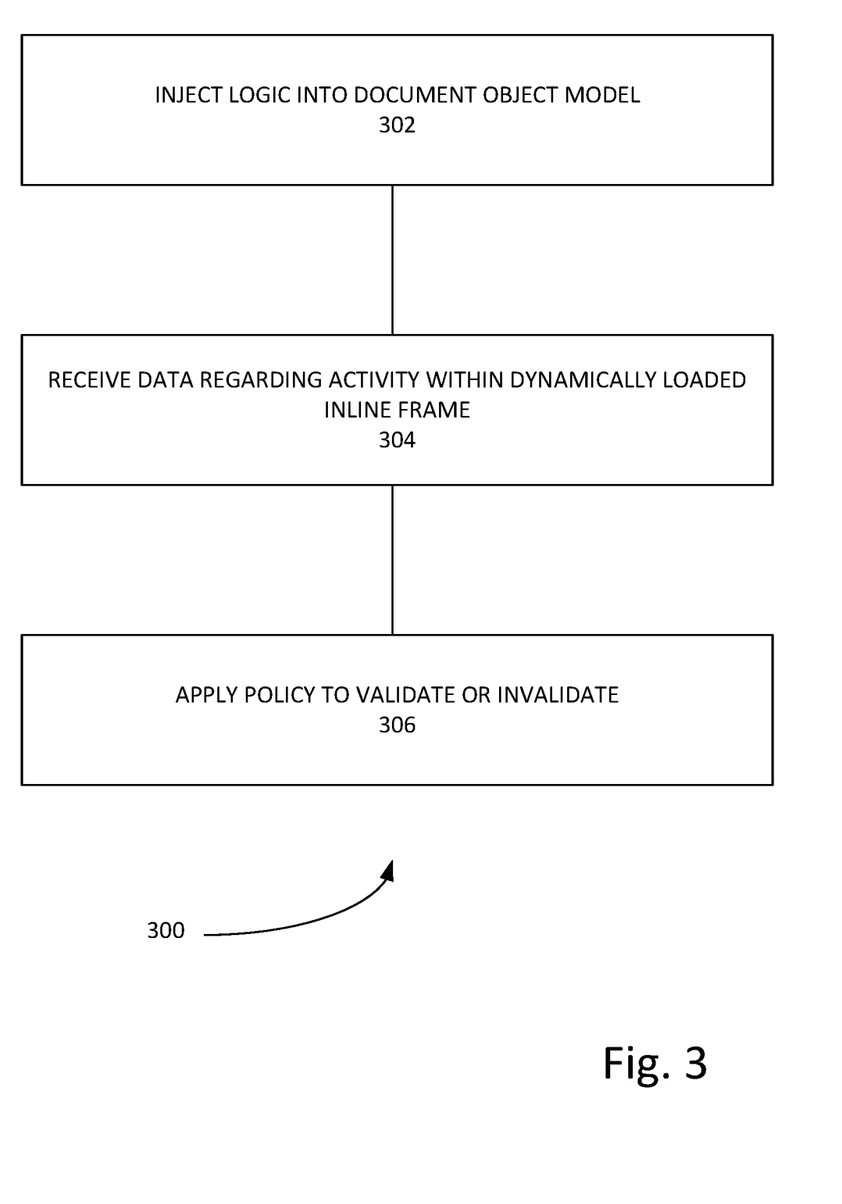
FIG. 3 is a block diagram illustrating an example method of the inline frame monitor of FIG. 2.

FIG. 3 illustrates an example method 300 that can be applied with the inline frame monitor 202. For example, the inline frame monitor 202 can be implemented with a processor 102 and a nontransitory computer readable medium 104, such as a processor and computer readable medium in a server or a datacenter, comprising instructions. The nontransitory computer readable medium 104 can include a memory device to store computer executable instructions that when executed cause the processor 102 to perform method 300. In the method 300, monitoring logic is injected into the DOM to monitor dynamically loaded iframes of a web page at 302. Data regarding an activity within the dynamically loaded inline frame is received at 304. A policy is applied to the data to validate or invalidate the activity within the dynamically loaded inline frame at 306.

Monitoring logic injected into the DOM at 302 can include instructions to monitor content in the inline frames.

Monitoring logic can be provided from the inline frame monitor 202, in one example, or from another feature of the security service 212. In one example, the monitoring logic is directed to monitor events in an iframe that is created at the client side and dynamically loaded with HTML content from the parent frame. The monitoring logic included at the DOM at 302 is able to detect the client-side created iframe and the contents loaded into the client-side created iframe. For example, the monitoring logic can detect an empty iframe, such as an iframe without a specified universal resource locator or web address, or URL. The empty iframe may pass through a typical security service, and the iframe may be loaded with content at the client side that is otherwise not detected with a typical security service. The monitoring logic can detect the client-side activity. In one example, the monitoring logic can be included as part of or generated from a program that is installed on the user device 204 or otherwise configured to operate with the user agent 210. In one example, the program can include or be part of inline frame monitor 202. The program injects, such as adds to or modifies, monitoring logic to the DOM to track or detect client-side activities of the web page.

Monitoring logic can generate data related to client-side activities such as creating dynamically loaded iframes at 304. Client-side activities can include events at the user agent 210 that provide content to or export data from within the iframe. Monitoring logic can provide the data regarding a client-side event to the inline frame monitor 202. The data received at the inline frame monitor can be used to determine whether the client-side activity is compliant with a policy, such as an enterprise policy established with security service 212. The policy is applied to the data to validate or invalidate the activity within the dynamically loaded inline frame at 306. For example, the inline frame monitor 202 can validate the event if the event is compliant with the policy, and the event can proceed within the user agent 210. The inline frame monitor 202 can invalidate the activity is the event is not compliant with the policy. The inline frame monitor can block the invalidated event such as prevent the loading of the content or the export of data, alert an administrator of the invalidated event, log the invalidated event, or take other action appropriate based on the enterprise policy.

The example inline frame monitor 202 and method 300 can be implemented to include a combination of one or more hardware devices and computer programs for controlling a system, such as a computing system having a processor 102 and memory 104, to perform method 300. For instance, inline frame monitor 202 and method 300 can be implemented as a computer readable medium or computer readable storage device having set of executable instructions for controlling the processor 102 to perform the method 300. The inline frame monitor 202 and method 300 can be included as a service in a cloud environment, such as a security service 212 implementing a cloud access security broker to enforce security polices, and implemented on a computing device 100 in a datacenter.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method, comprising:
   monitoring a web page, which is accessed by a client agent via a security service proxy server according to a security policy, the web page including an inline frame created at the client agent, wherein content loaded into the inline frame at the client agent is not detected at the proxy server;
   injecting monitoring logic from the security service proxy server into a document object model at the client agent, the monitoring logic including instructions to detect creation of the inline frame and to monitor activity associated with content that is loaded into the inline frame of the web page at the client agent, the activity including an attempt to export data, which is loaded into the inline frame at the client agent, from within the inline frame;
   receiving data from the monitoring logic at the security service proxy server regarding the activity, including the attempt to export the data, which is loaded into the inline frame at the client agent, from within the inline frame; and
   applying the security policy at the security service proxy server to validate or invalidate the activity associated with the content loaded into the inline frame at the client agent.

2. The method of claim 1 comprising:
   downloading a program to inject the monitoring logic into the document object model.

3. The method of claim 1 wherein the client agent includes a web browser.

4. The method of claim 1 wherein the inline frame includes an empty inline frame in the web page that is created within the client agent and that is injected with hypertext markup language from the web page.

5. The method of claim 1 wherein an invalidated activity is blocked.

6. The method of claim 1 wherein an invalidated activity generates an alert to an administrator.

7. The method of claim 1 wherein a validated activity proceeds within the client agent.

8. A computer readable storage device to store computer executable instructions to control a processor to:
   monitor a web page, which is accessed by a client agent via a security service proxy server according to a security policy, the web page including an inline frame created at the client agent and a parent frame, the inline frame including an empty inline frame that is dynamically injected with hypertext markup language from the parent frame of the web page at the client agent, wherein the hypertext markup language that is dynamically injected into the empty inline frame from the parent frame at the client agent is not detectable at the proxy server;
   inject monitoring logic from the security service proxy server into a document object model at the client agent, the monitoring logic including instructions to detect creation of the empty inline frame at the client agent and to further detect the hypertext markup language dynamically injected into the empty inline frame from the web page at the client agent;
   receive data from the monitoring logic at the security service proxy server regarding creation of the empty inline frame at the client agent and dynamic loading of the hypertext markup language from the parent frame of the web page into the empty inline frame at the client agent; and
   apply the security policy at the security service proxy server to validate or invalidate dynamic loading of the hypertext markup language from the parent frame of the web page into the empty inline frame at the client agent.

9. The computer readable storage device of claim 8 wherein the instructions to inject monitoring logic are performed in a client device.

10. The computer readable storage device of claim 8 wherein the document object model is included in a web browser.

11. A system, comprising:
a memory device to store a set of instructions; and
a processor to execute the set of instructions to:
monitor a web page, which is accessed by a client agent via a security service proxy server according to a security policy, the web page including a parent document from a resource device and an inline frame that is created at the client agent, the inline frame including an empty inline frame that is created at the client agent and that is dynamically loaded with content from the parent document by the client agent, wherein the content that is dynamically loaded into the empty inline frame from the parent document at the client agent is not detected at the proxy server;
inject monitoring logic from the security service proxy server into a document object model at the client agent, the monitoring logic including instructions to monitor activity associated with the inline frame of the web page, the activity including creation of the empty inline frame at the client agent and dynamic loading of the content from the parent document into the empty inline frame by the client agent;
receive data from the monitoring logic at the security service proxy server regarding the activity associated with the inline frame of the web page, the data indicating the creation of the empty inline frame at the client agent and the dynamic loading of the content from the parent document into the empty inline frame by the client agent; and
apply the security policy at the security service proxy server to validate or invalidate the dynamic loading of the content from the parent document into the empty inline frame at the client agent.

12. The system of claim 11 configured as a proxy server system.

13. The system of claim 12 wherein the proxy server system directs web traffic between a client device and a content server.

14. The system of claim 11 included in the security service proxy server.

15. The system of claim 14, wherein the security service proxy server monitors static web pages.

16. The method of claim 4, wherein the empty inline frame does not have a specified universal resource locator.

17. The method of claim 4, wherein the empty inline frame of the web page passes through the security service proxy server and is dynamically loaded with a hypertext markup language document, which is not detected by the security service proxy server, from a parent frame of the web page at the client agent.

18. The computer readable storage device of claim 8, wherein the empty inline frame does not have a specified universal resource locator.

19. The system of claim 11, wherein the inline frame of the web page includes the empty inline frame, which passes through the security service proxy server.

20. The system of claim 11, wherein the empty inline frame does not have a specified web address.

* * * * *